United States Patent

Rothe et al.

[11] Patent Number: 5,816,644
[45] Date of Patent: Oct. 6, 1998

[54] FOLDING TOP FOR A CONVERTIBLE

[75] Inventors: Karl Rothe, Bramsche; Joachim Maass, Bissendorf, both of Germany

[73] Assignee: Wilhelm Karmann GmbH, Osnabrueck, Germany

[21] Appl. No.: 667,105

[22] Filed: Jun. 20, 1996

[30] Foreign Application Priority Data

Jun. 22, 1995 [DE] Germany .................. 295 10 117.2
Jun. 22, 1995 [DE] Germany .................. 295 10 118.0

[51] Int. Cl.⁶ ........................................ B60J 7/12
[52] U.S. Cl. ............................... 296/107; 296/117
[58] Field of Search ........................ 296/107, 116, 296/117

[56] References Cited

U.S. PATENT DOCUMENTS 5,042,868 8/1991 Nothaft et al. .................. 296/107

FOREIGN PATENT DOCUMENTS 3726430 9/1988 Germany .................. 296/107

Primary Examiner—Gary C. Hoge
Attorney, Agent, or Firm—Jordan and Hamburg

[57] ABSTRACT

A foldable top for a convertible includes a vehicle body, a windshield frame on the vehicle body, a rear region on the vehicle body disposed rearwardly of the windshield frame, a foldable-rod linkage supportable on the windshield frame, a main power operated device mounted on the vehicle body for moving the foldable-rod linkage between closed and open positions, and a rear roof clamping member at the rear region of the vehicle body. Rail members are pivotably connected to each other and are also pivotably connected to the foldable-rod linkage and to the clamping member. A tensioning linkage is pivotably connected to one of the rail members and pivotably connected to the vehicle body. A drive mechanism mounted on the vehicle body is pivotably connected to the tensioning linkage and is operable to pivot the tensioning linkage which in turn pivots the rail members.

10 Claims, 8 Drawing Sheets

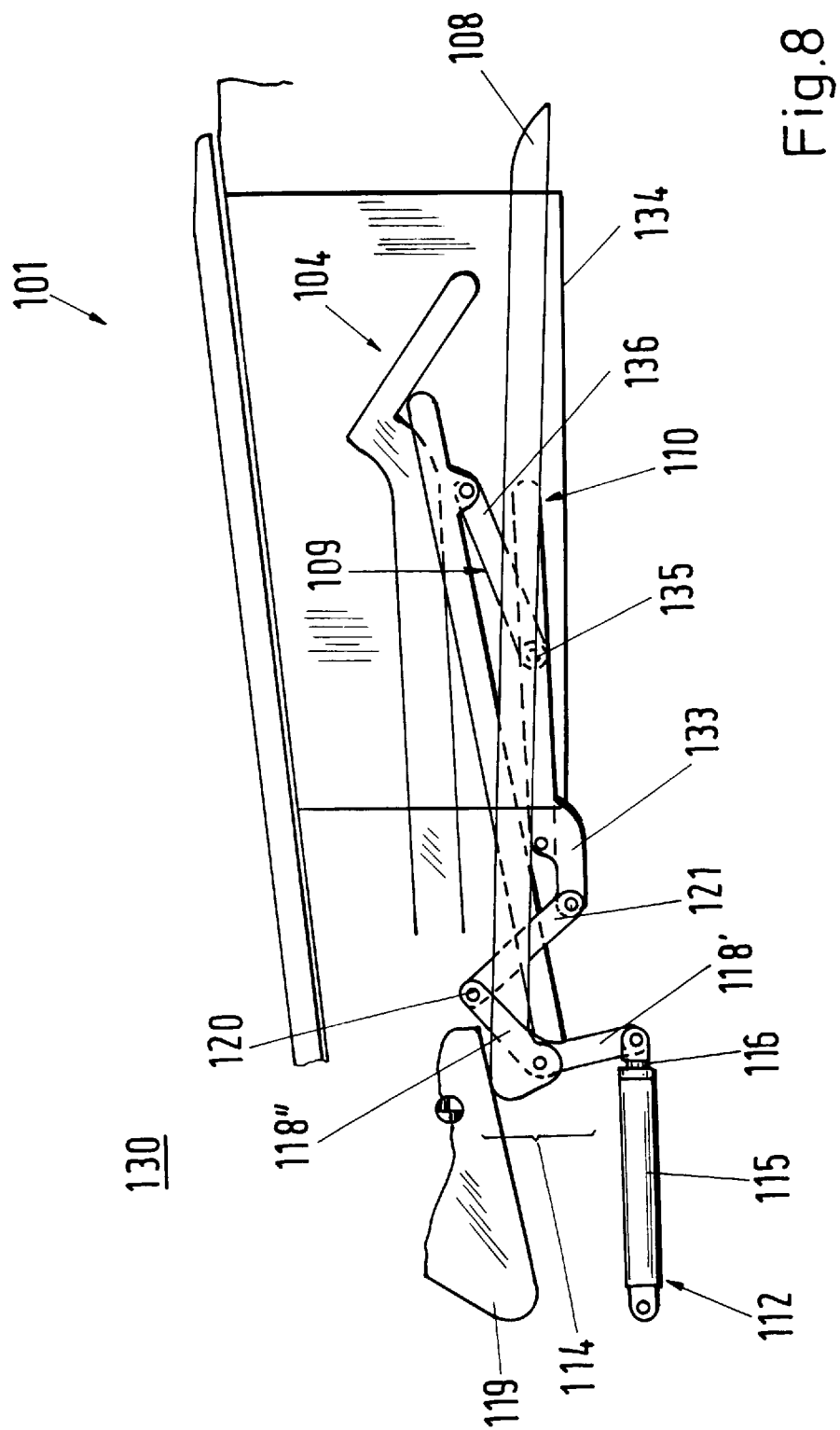

FOLDING TOP FOR A CONVERTIBLE

BACKGROUND OF THE INVENTION

In the case of a known folding top in DE 39 14 638 A1, the roofing region of the top, which is tensioned at the rear in the closed position, is gripped from below on both sides by a storm rail, which stiffens the contour of the roofing region and consists of two storm-rail parts, which are linked together. The storm rail part at the front (in the direction of the longitudinal axis of the vehicle) is connected with a main column in the region of the front rod linkage parts and the rear storm rail part is supported on a rear tightening clamp for the top. At the same time, a driving mechanism, with which the closing and opening motion of the storm rail is controlled, is provided between the tightening clamp for the top and front storm rail part. With the driving mechanism, which is constructed particularly as a hydraulic cylinder, the expense associated with the pipelines to the pressure medium supply is high, the free space in the roofing region in the rear is limited disadvantageously and, for the passengers, there is an additional hazard, for example, in the case of an accident, due to the cylinder components integrated into the roofing.

SUMMARY OF THE INVENTION

It is an object of the invention to provide a folding top for a convertible, the storm rails of which, with structurally simple means requiring little space, a hazard-free arrangement and adequate head space in the rear seat region, make an improvement in the automatic control of the top possible.

With the driving mechanism supported on the body and the tensioning rod linkage unit, which can be moved with this driving mechanism, the design of the folding top, which is constructed pursuant to the invention, is such that the storm rails can be operated automatically and fixed in a position beyond dead center. By means of the rocker arm, which is coupled on one side with the driving element of the driving mechanism supported on the body, and the tensioning lever, an operative connection, which is associated with little expense for construction and with which a space-saving positioning of the driving mechanism, constructed particularly as a hydraulic cylinder, in the rear lower region of the vehicle is possible, is created.

At the same time, drive components, particularly the supply lines for the hydraulic cylinder, which represent a high risk potential because of a high internal pressure, can be integrated with little technical effort into the body of the vehicle in such a manner that, even in the event of a defect in the pipeline region, the rear seat region of the vehicle is unimpaired and risk to the passengers is precluded.

By means of a structural arrangement of the respective linkage points of the tensioning rod linkage in the region of the rocker arm and the tensioning lever, an emergency operation for the automatic folding top, which can be operated manually, is created with little effort so that a positioning of the folded top and an unimpeded use of the vehicle are possible, for example, also in the event of a failure of the hydraulic driving system.

In a second embodiment, the folding top has a control construction with an elbow lever and a tensioning lever. The compact operative connection of the components is created over the elbow lever coupled, on the one hand, to the driving element of the driving mechanism supported on the body and, on the other, to the tensioning lever for the storm rails, which engage the second leg of the elbow lever.

With the control motions of the elbow lever, the storm rail parts can be swiveled during the opening as well as during the closing motion of the folding top advantageously on a path of motion, causing only little mechanical stressing of the roofing, in such a manner that, in addition, the rear seat region remains largely free, the components of the folding top above a rear seat passenger have no effect on the head space and, as a result, the opening and closing motions of the folding top are conceivable even when the vehicle is occupied.

In the closed position, a dead center is formed in the joint connecting the elbow lever and the tensioning lever. With the supporting action of this dead center, the folding top provides better security in the rear region against theft or against unintended entry into the interior of the vehicle.

With respect to further advantages and details of the invention, reference is made to the following description and drawing, in which examples of the inventive folding top are shown diagrammatically in greater detail.

BRIEF DESCRIPTION OF THE DRAWINGS

FIG. 8 shows an elevation view, similar to that of FIG. 6, with the folding top deposited in a top storage well.

DESCRIPTION OF THE PREFERRED EMBODIMENTS

Figure 1:
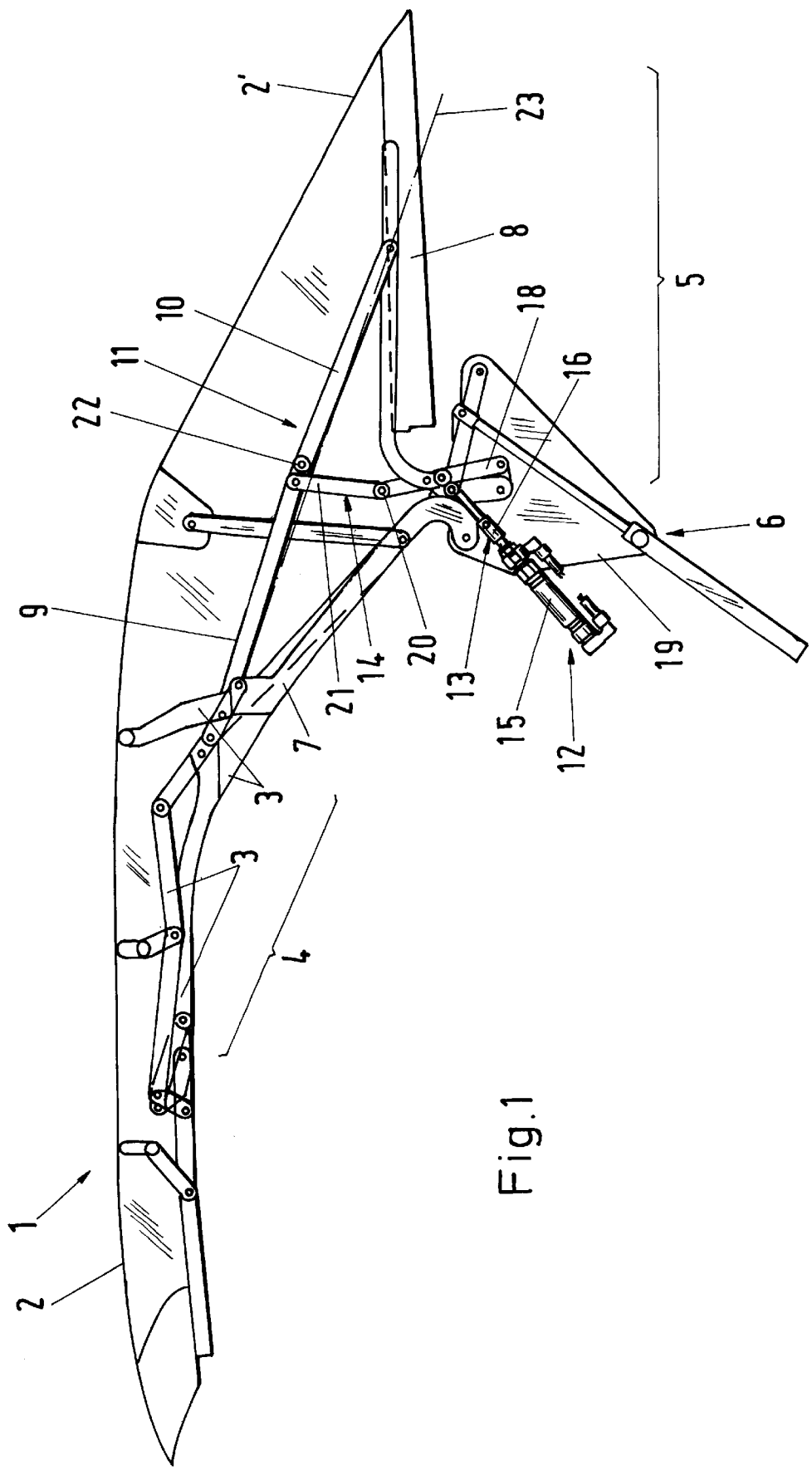
FIG. 1 shows a diagrammatic representation of a folding top for a convertible in elevation in the closed position.

FIG. 1 shows a folding top 1 for a convertible. Corresponding components, disposed symmetrically to the longitudinal axis of the vehicle and characterizing the overall construction of the folding top, cannot be seen in this elevation.

The vehicle 1 is provided with roofing 2, which is taken up between opposite rod linkage legs 3 of a folding rod linkage 4, which can be fixed in the region of the front windshield frame (not shown). The folding rod linkage 4 has a main drive 6, which is supported in the rear region 5 of the vehicle, the rear roof region 2' being provided with these storm rails 11, consisting of pivotably connected storm rail parts 9, 10, which grip the roofing region 2' from below. For the folding top proposed in DE 39 14 638 A1, a driving mechanism, moving the storm rail parts 9, 10 into different pivotal positions, is provided directly between the storm rail parts 9, 10.

The folding top 1, constructed pursuant to the invention, is provided with storm rails 11, which are constructed in each case with a driving mechanism 12, which is supported on the car body and the driving element 13 of which is connected with a tensioning rod linkage unit 14 which, on the one hand, is supported pivotably in the region of the body of the vehicle and, on the other, is coupled to one of the two storm rail parts 9, 10. The rear storm rail linkage part 10 is supported at the tightening clamp 8 in the region of the rear roofing 2' and the front storm rail part 9 is connected with the folding rod linkage 4 in a manner, so that the tensioning rod linkage 14 and the storm rail parts 9, 10 can be moved independently of the main driving mechanism 6.

In an appropriate embodiment, the driving mechanism 12 is formed by a hydraulic driving cylinder 15, the working piston 16 of which is connected with the tensioning rod linkage unit 14 in the region of a rocker arm 18.

For this multi-part tensioning rod linkage unit 14, the driving motion of the driving cylinder is transferred to the storm rod linkage parts 9, 10 owing to the fact that the driving piston 16 engages the rocker arm 18 of the tensioning rod linkage unit 14 essentially centrally and that the rocker arm 18, which is pivotably supported in the region of the main bearing 19 of the top, is connected in the region of the elbow joint 20 with a tensioning lever 21 in a manner, so that the storm rail 11 can be moved with this tensioning lever 21 in correspondence with the motion of the driving piston 16 towards or away from the roofing 2'.

Likewise, it is conceivable in a further embodiment (not shown) that the driving element 13 of the driving cylinder 12 engages the rocker arm 18 at the end away from the tensioning lever 21 and supports this, in turn, in the region of a drag bearing, disposed centrally at the main bearing 19 of the top.

The dimensions of the rocker arm 18 and of the tensioning lever 21 of the rod linkage unit 14 advantageously are such that, in the closed position of the folding top (FIG. 1), the storm rail parts 9, 10 have a position beyond dead center in the region of their common connecting link 22. This beyond dead-center position is indicated by a line of dots and dashes 23 in FIGS. 1 and 2. In the motion phase of FIG. 2, the tensioning rod linkage unit 14 already tilts the connecting link 22 into a region below the line 23 and, with that, relieves the tension on the roofing 2.

It is furthermore clear in the embodiment of the folding top 1 of FIG. 1 that the driving mechanism 12 or driving cylinder 15 of the tensioning rod linkage unit 14 is disposed in an appropriate construction in a position, which is directed towards the folding rod linkage 4 and is essentially parallel to the main driving mechanism 6 of the folding rod linkage 4.

Figure 2:
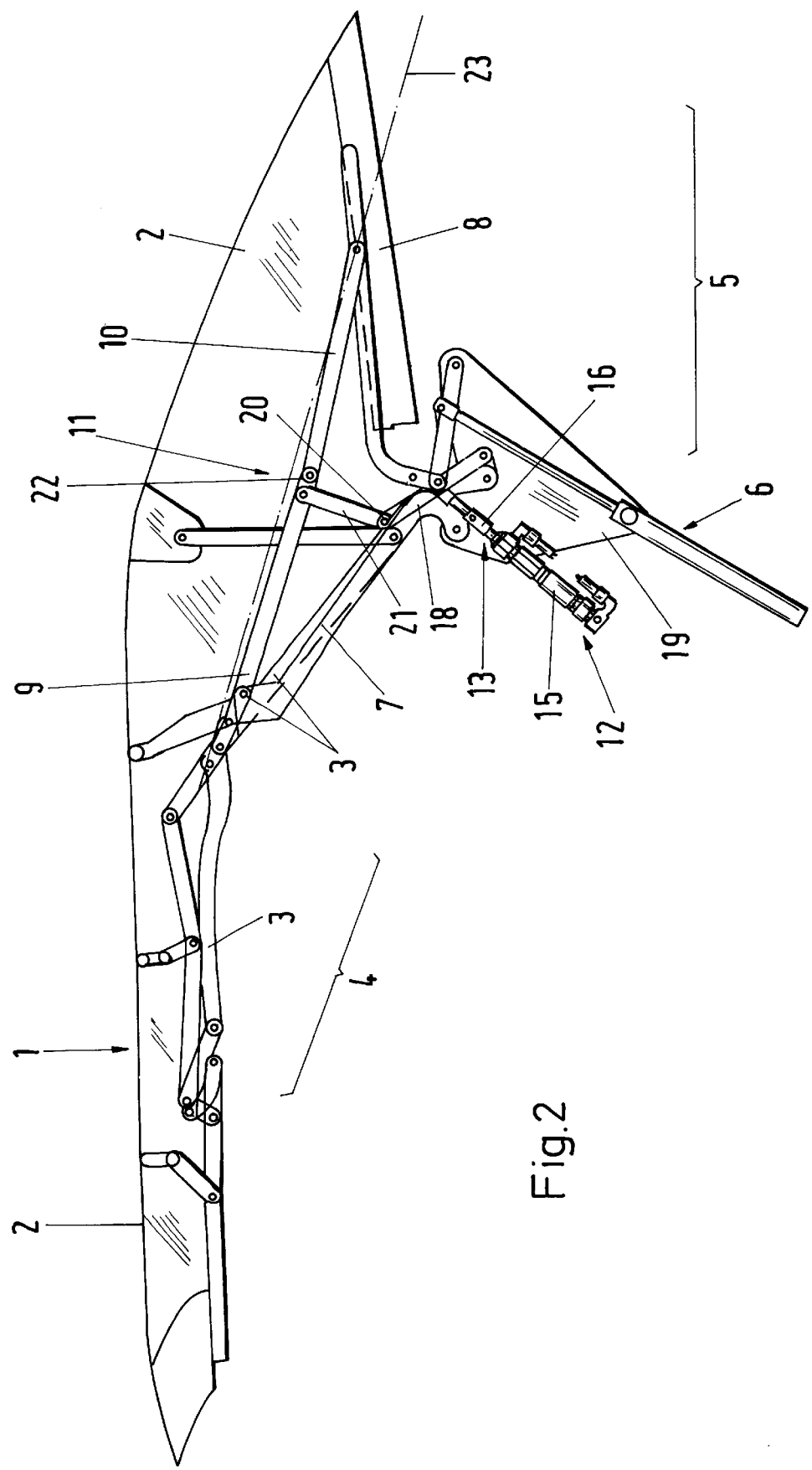
FIGS. 2 to 4 show diagrammatic representations, similar to those of FIG. 1, with the folding top in different folding positions.
Figure 4:
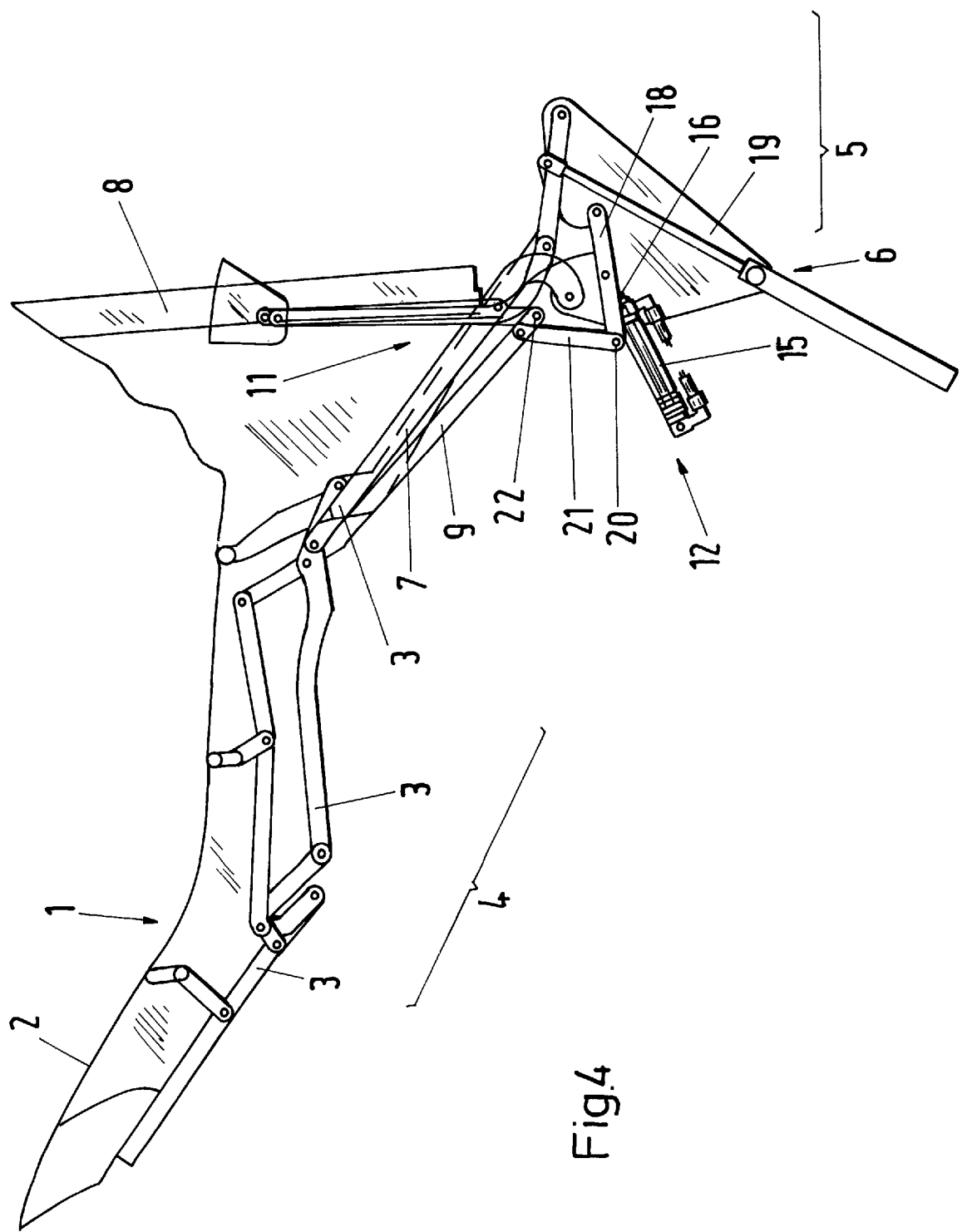

With that, the motion of the storm rail 11 can be initiated on the whole uniformly over the components of the tensioning rod 14, so that, for example, when going through an opening motion corresponding to the motion phases in FIGS. 2 and 4, little space is required for the relief of the tension on the folding top 1, which is achieved before the folding top has been tilted back into the rear region 5 of the vehicle.

In an appropriate embodiment, the tensioning rod linkage unit 14 with the driving mechanism 12 is connected over the storm rail part 10 in such a manner with the tightening clamp 8 of the roofing 2', so that the driving mechanism 12, in a double function controllable over controller (not shown), can also control the motion of the tightening clamp 8, so that the stress on the main drive 6 is relieved and there is no need for other connecting components.

Figure 5:
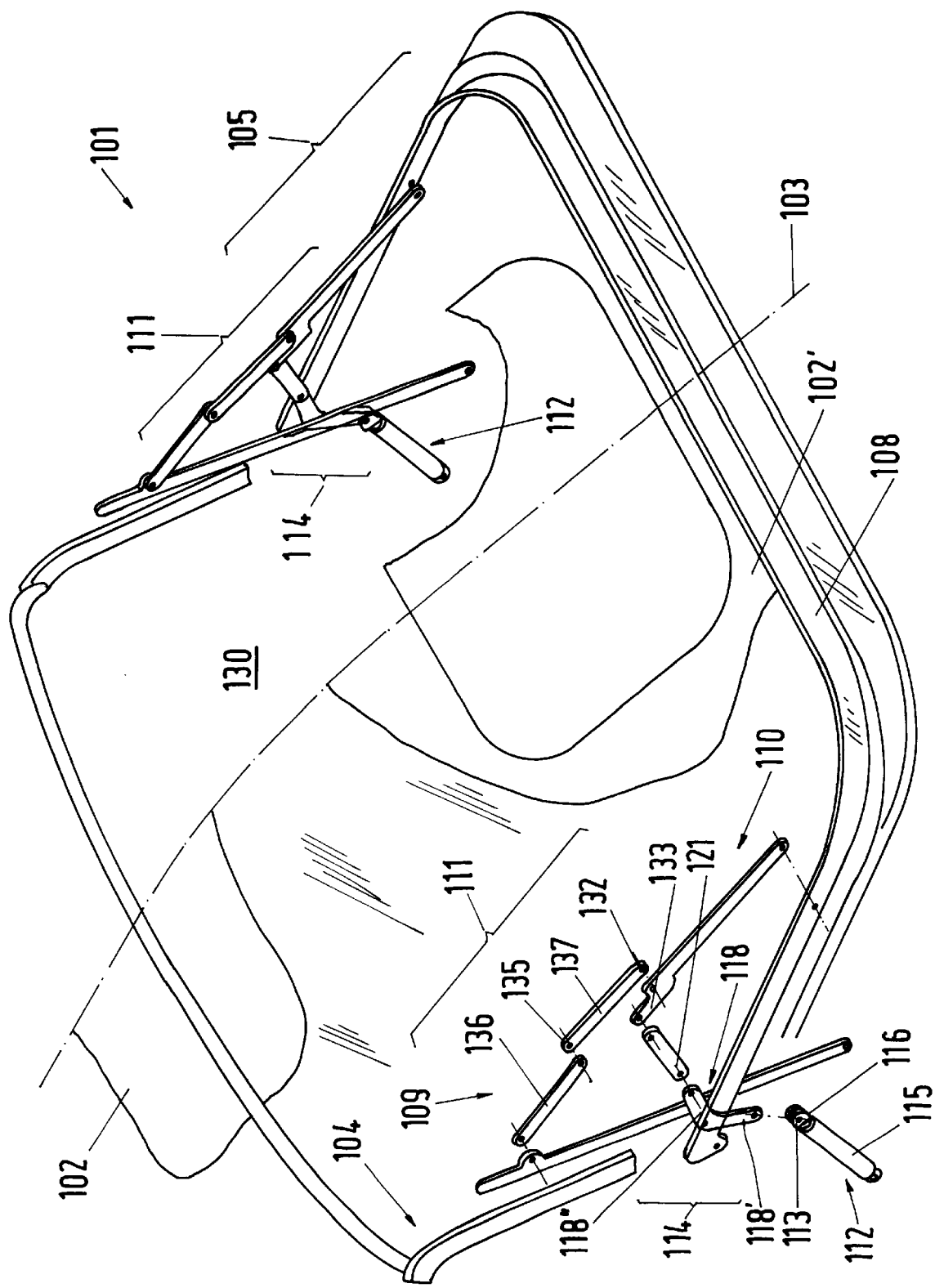
FIG. 5 shows a perspective rear view of a folding top for a convertible with rod linkage parts, shown in a partially exploded representation, in a second embodiment.

In FIG. 5, a second embodiment of a folding top 101 for a convertible is shown. In this perspective rear view, components, corresponding to the components, which are disposed symmetrically to the longitudinal axis 103 of the vehicle and characterize the overall construction of the folding top 101, can be seen in an exploded representation on the left side and in an installed position on the right side.

The folding top 101 is provided with a roofing 102, which is taken up between two opposite legs of a folding rod linkage 104, which can be fixed in the region of the front windshield frame (not shown). In the rear region 105 of the vehicle, the folding rod linkage 104 has a main driving mechanism 106, which is supported on the body in the rear region 105 of the vehicle. The rear roofing region 102' is provided with these storm rails 111, which consist of pivotably connected storm rail parts 109, 110 and grip underneath the edge of the roofing area 102' at the rear.

The folding top 101, constructed pursuant to the invention, is provided with storm rails 111, which are each provided with a driving mechanism 112 supported on the body, the driving element 113 of which driving mechanism 112 is connected with a tensioning rod linkage unit 114 which, on the one hand, is supported pivotably in the region of the vehicle body and, on the other, coupled with one of the two storm rail parts 109, 110. The rear storm rail part 110 is supported at the tightening clamp 108 in the region of the rear roofing 102' and the front storm rail part 109 is connected with the folding rod linkage 104 in a manner so that the tensioning rod unit 114 and the storm rail parts 109, 110 can be moved independently of the main driving mechanism 106.

Figure 6:
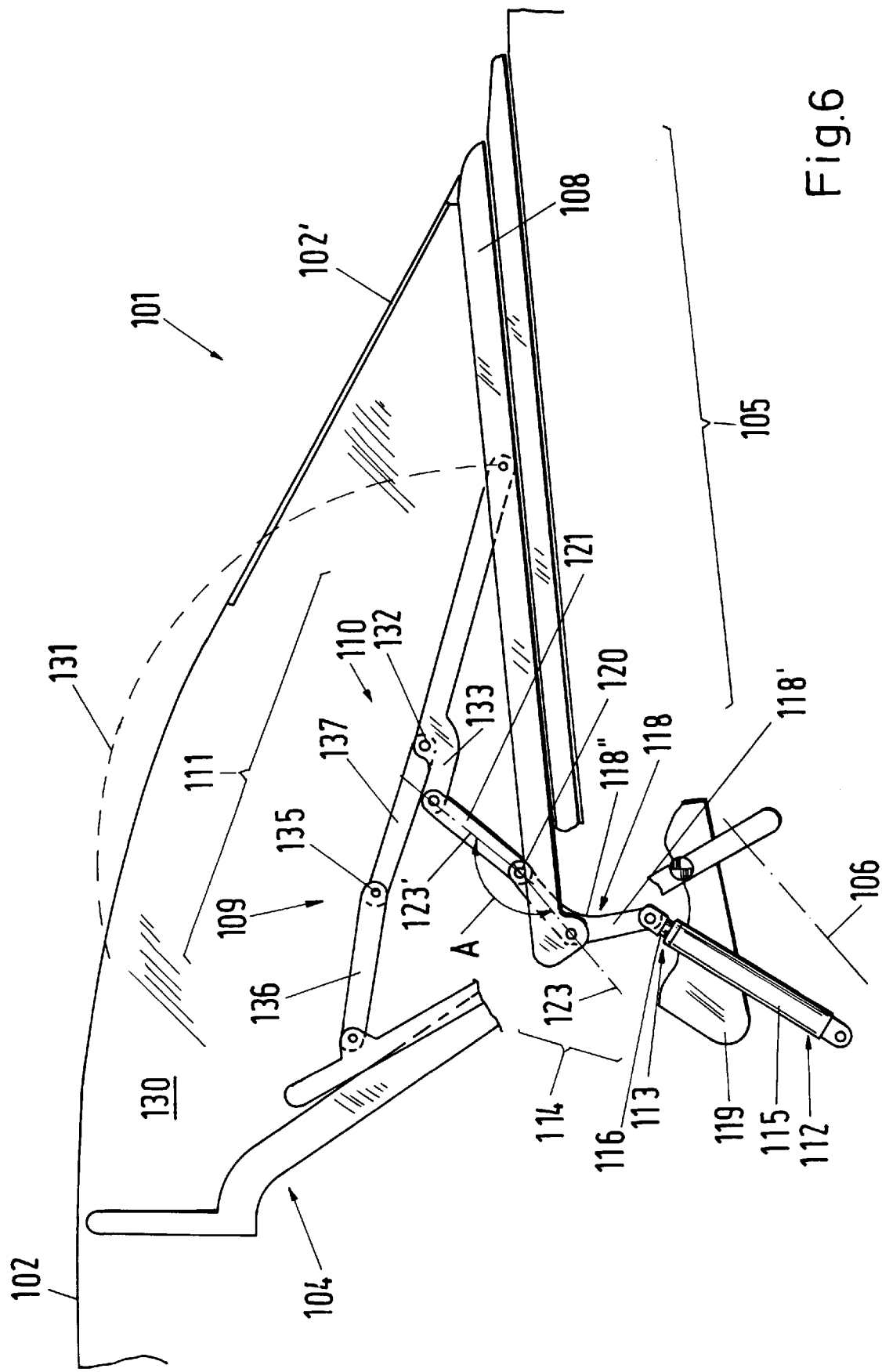
FIG. 6 shows an elevation view of the folding top of FIG. 5.

In an appropriate construction, the driving mechanism 112 is formed by a hydraulic driving cylinder 115, the operating piston 116 of which is connected with the tensioning rod linkage unit 114 in the region of an elbow lever 118 (FIG. 6).

For this multi-part tensioning rod linkage unit 114, the driving motion of the driving cylinder 115 is transferred to the storm rail parts 109, 110 owing to the fact that the operating piston 116 engages a leg 118' of an elbow lever 118, the latter is pivotably supported in its middle region at a main bearing 119 of the top and a second leg 118" is connected in the region of an elbow joint 120 with a tensioning lever 121 in such a manner that the storm rail 111 can be moved with this tensioning lever 121 towards or away from the roofing 102' in correspondence with the motion of the driving cylinder 116.

The elbow lever 118 or its leg 118', 118" and the tensioning lever 121 of the rod linkage unit 114 are dimensioned advantageously in such a manner in this connection, that a dead point position is formed in the region of the common elbow joint 120 in the closed position of the folding top 101 (FIG. 6). This dead point position is shown by an angle A, formed between the leg 118' and the tensioning lever 121 (lines 123, 123' of dots and dashes in FIG. 6).

In the embodiment of the folding top 101 of FIG. 6, which is shown, it is furthermore made clear that the driving mechanism 112 of the driving cylinder 115 of the tensioning rod linkage unit 114 in an appropriate embodiment is installed in a position directed towards the folding rod linkage 104 and essentially parallel to the main driving mechanism 106 of the folding rod linkage 104.

Figure 7:
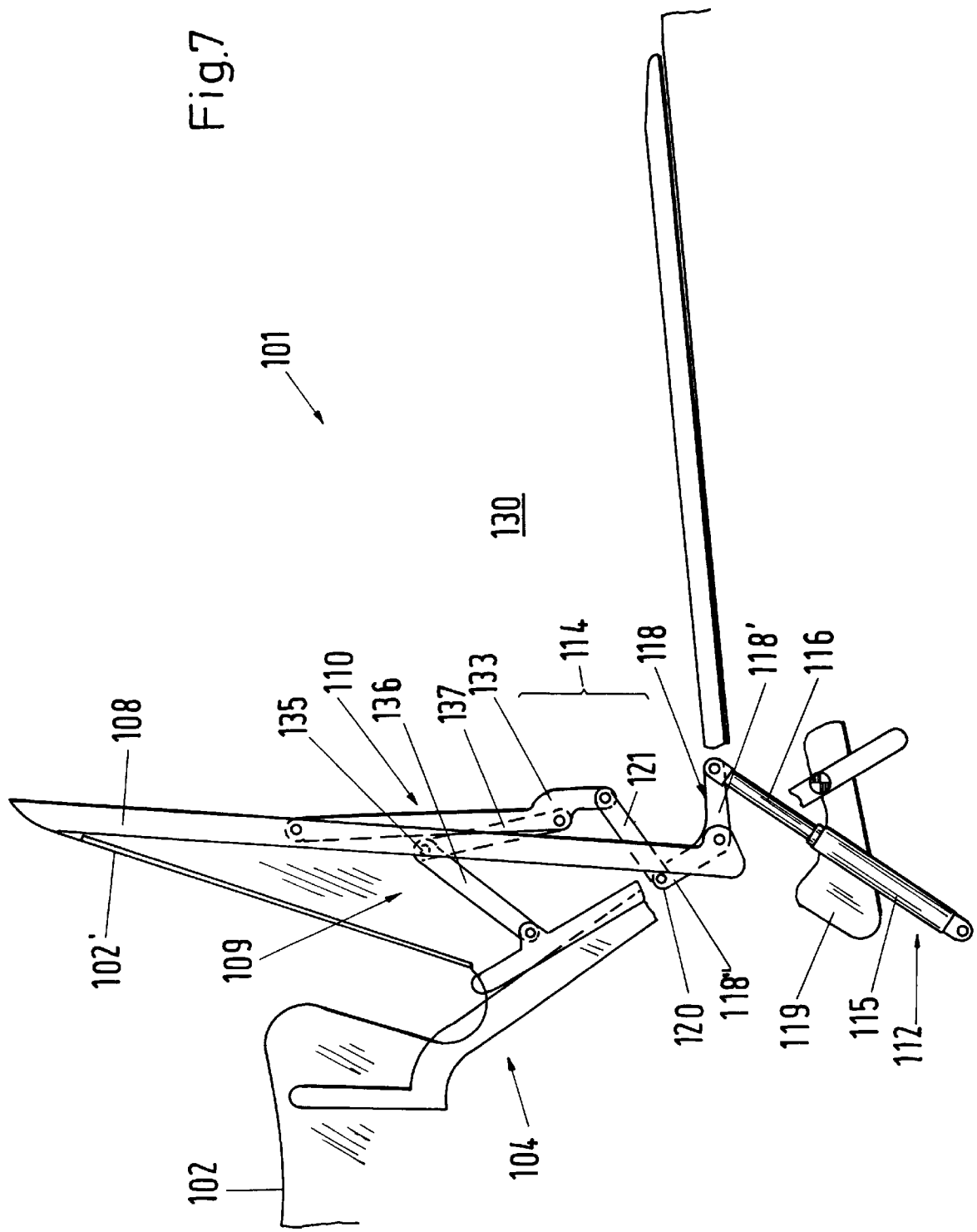
FIG. 7 shows an elevation view, similar to that of FIG. 5, with a folding top in a first opening phase.

With that, the motion of the storm rail 111 can be initiated on the whole uniformly over the components of the tensioning rod 114, so that, for example, when going through an opening motion corresponding to the motion phases in FIGS. 7 and 8, little space is required for the relief of the tension on the folding top 101 (FIG. 7), which is achieved before the folding top has been tilted back into the rear region 105 (FIG. 8) of the vehicle.

The above-described components of the tensioning rod linkage unit 114 interact advantageously with the storm rail 111 and the tightening clamp 108 in such a manner that a path of motion 131 can be imparted to the folding top 101 and effectively provides head space in the region 130 of the back seat (FIG. 6).

In the region of the storm rail 111, the tensioning lever 121 is connected with the rear storm rail part 110 near the connecting link 132 between the two storm rail parts 109, 110. The course of the contour of the path of motion 131 is effected particularly advantageously by the fact that the rear storm rail part 110 has a molded shoulder 133, which is parallel to the longitudinal direction and connected at the front with the tensioning lever 121. In the packed position of the folding top 101 (FIG. 8), a further lowering of the components in the region of the top storage well 134 is achieved with the molded shoulder 133.

For moving the folding top 101 along the advantageous path of motion 131, the front storm rail part 109 is provided with two folding legs 136, which have a common link 135 and with which a stable support of the folding top 101 is attained during the first opening phase (FIG. 7). The folding legs 136, 137 are constructed essentially of equal length and the associated link 135 is disposed centrally.

Figure 3:
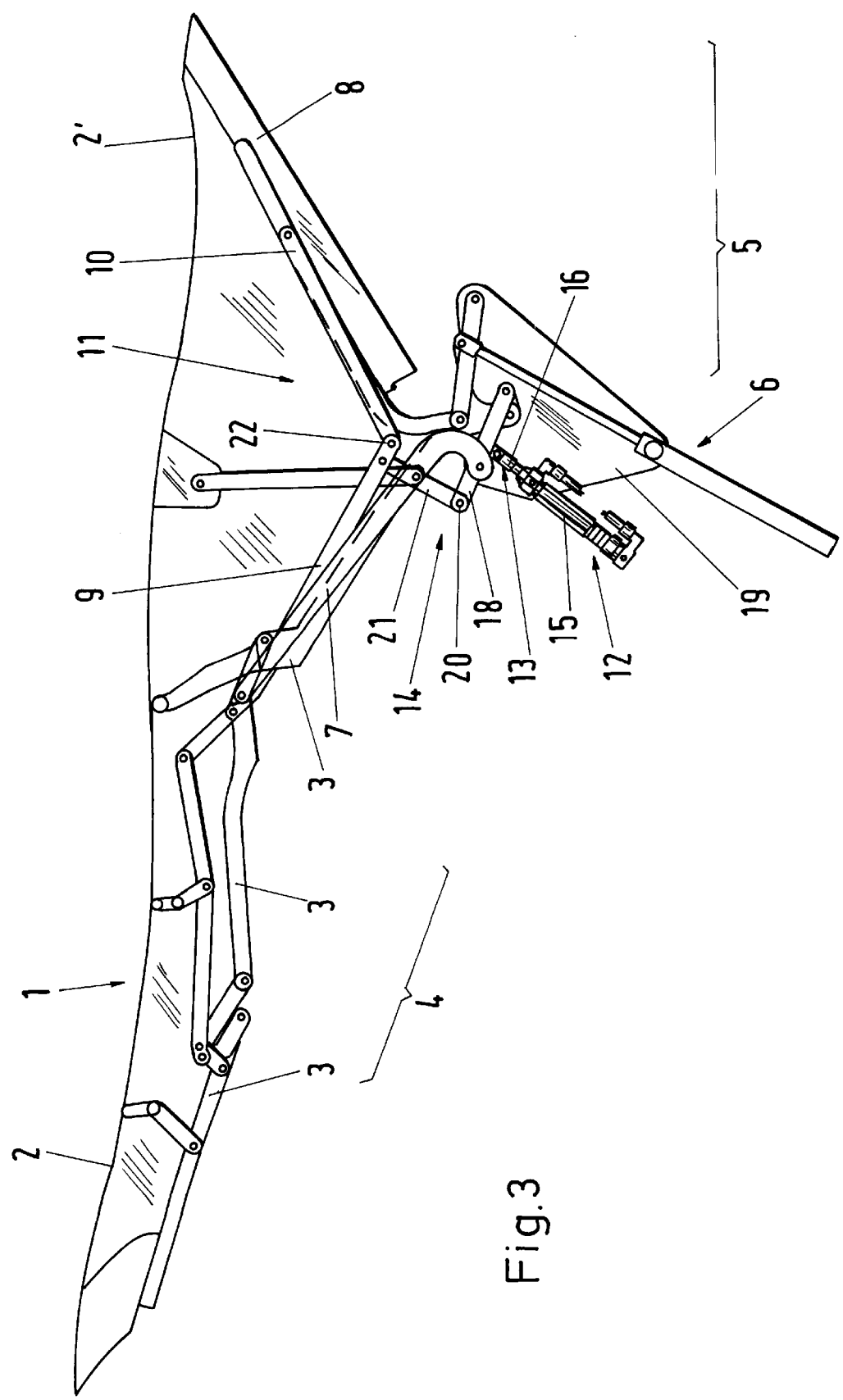

For the positionally accurate movement of the folding top 101 into the essentially vertical opening position of FIG. 3 or the storage position of FIG. 8, switch elements (not shown), in each case constructed as microswitches, are provided in the region of the driving mechanism 112 and/or the tensioning rod linkage unit 114. In an advantageous development, the elbow lever 118 can also be provided in the region of one of its two legs 118', 118" with a mechanical stop part (not shown), over which the tensioning rod unit 114 interacts with the rod linkage legs of the folding rod linkage 104 without additional microswitches in such a manner, that overloading of rod linkage components or jamming of the roofing 102 in any phase of the motion of the folding top 101 is excluded with sufficient reliability.

What we claim is:

1. In a foldable top for a convertible vehicle body in which the convertible vehicle body includes a windshield frame and a rear region and wherein the foldable top includes folding-rod linkage which is supportable on the windshield frame and which also includes a main power operated device mounted on a main support fixed to said vehicle body for moving the foldable top between closed and open positions, the foldable top further having a rear clamping member at the rear region of the vehicle body, comprising rail members pivotably connected to each other and pivotably connected to said folding-rod linkage and to said clamping member, a tensioning linkage pivotably connected to one of said rail members and pivotably connected to said main support, and drive means mounted on said main support and pivotably connected to said tensioning linkage to pivot said tensioning linkage which in turn pivots said rail members.

2. In a foldable top according to claim 1 wherein said drive means comprises a hydraulic cylinder.

3. In a foldable top according to claim 2 wherein said main power operated device includes a cylinder having a longitudinal axis disposed substantially parallel to the longitudinal axis of said hydraulic cylinder of said drive means, said drive means being disposed between said main power operated device and said folding rod linkage.

4. In a foldable top according to claim 1 wherein said drive means is operable to pivot said tensioning linkage and said pivoting tensioning linkage is operable to pivot said rail members independently of said main power operated means.

5. In a foldable top according to claim 1 wherein said tensioning linkage comprises a rocker arm pivotably connected to said main support, and a tension lever pivotably connected to said rocker arm, said tension lever being pivotably connected to one of said rail members.

6. In a foldable top according to claim 5 wherein said drive means comprises a drive element which is pivotably connected to said rocker arm.

7. In a foldable top according to claim 1 wherein said rail members include a first rail member, first pivot means pivotably connecting said first rail member to said folding-rod linkage, a second rail member, second pivot means pivotably connecting said second rail member to said clamping member, third pivot means pivotably connecting said first rail member to said second rail member, and fourth pivot means pivotably connecting said tensioning linkage to one of said rail members, said fourth pivot means being spaced from said third pivot means.

8. In a foldable top according to claim 7 wherein said fourth pivot means is closer to said third pivot means than to said first pivot means.

9. In a foldable top according to claim 7 wherein said first and second rail members are operable to pass through a dead center position in which longitudinal axes of said first and second rail members extend along a straight line, said drive means being operable to pivot said tensioning linkage so that the tensioning linkage pivots the first and second rail members to a closed position in which the roof is in a closed position, said first and second rail members wherein in said closed position being in an off dead center position in which said third pivot means is disposed on one side of said straight line.

10. A foldable top for a convertible comprising a vehicle body, a windshield frame on said vehicle body, a rear region on said vehicle body disposed rearwardly of said windshield frame, a foldable-rod linkage which is supportable on the windshield frame, a main power operated device mounted on said vehicle body for moving the foldable-rod linkage between closed and open positions, a rear roof clamping member at the rear region of the vehicle body, rail members pivotably connected to each other and pivotably connected to said foldable-rod linkage and to said clamping member, a tensioning linkage pivotably connected to one of said rail members and pivotably connected to said vehicle body, and drive means mounted on said vehicle body and pivotably connected to said tensioning linkage for pivoting said tensioning linkage which in turn pivots said rail members, whereby said pivoting of said rail members pivots said clamping member between a substantially horizontally disposed closed position and a substantially vertically disposed open position independently of said main power operated device.

* * * * *